May 13, 1958 J. LOVELL 2,834,218
SCANNING DEVICE
Filed July 1, 1957 3 Sheets-Sheet 1
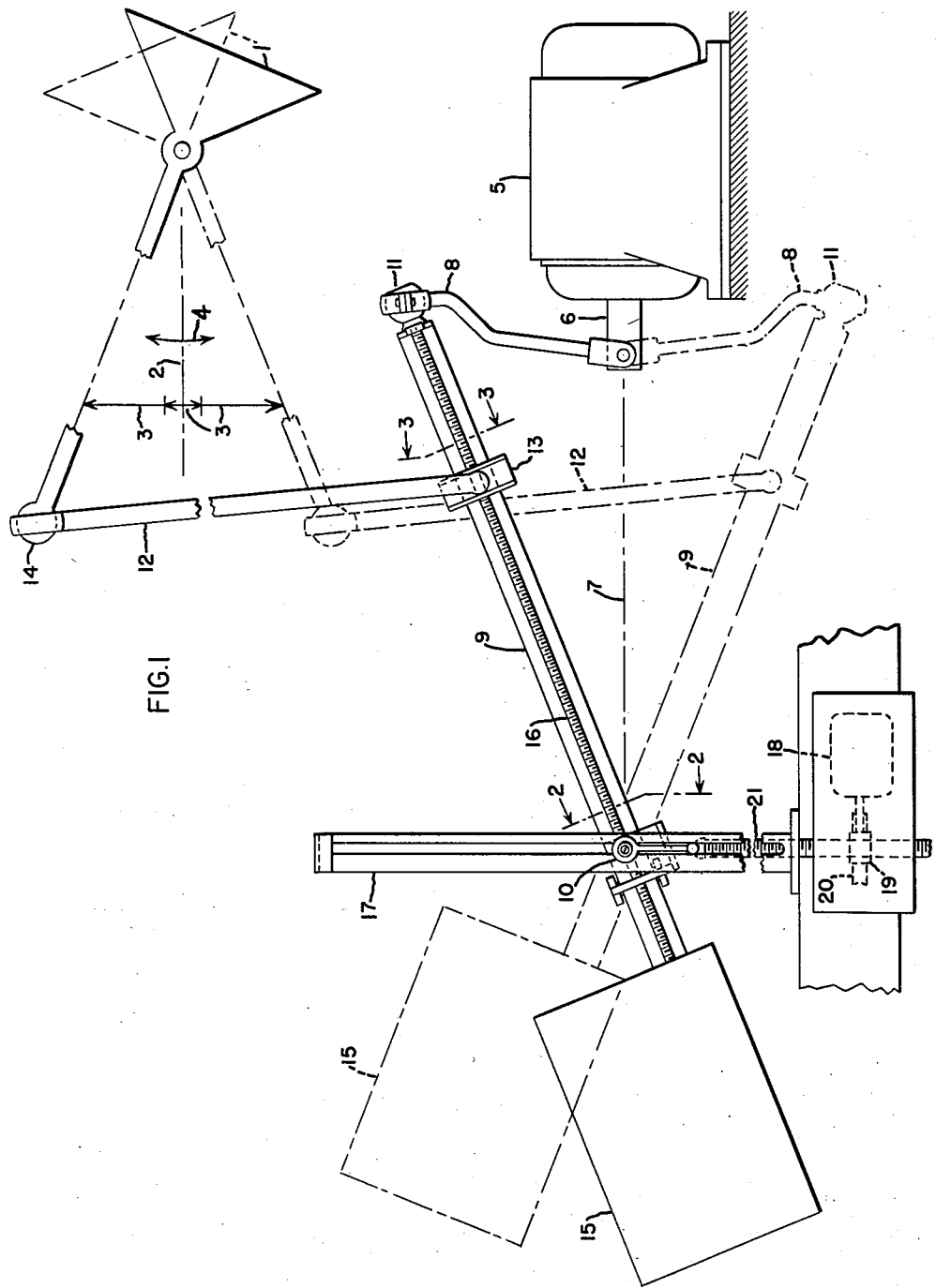
INVENTOR:
JOHN LOVELL,
BY Michael Masnik
HIS ATTORNEY.

May 13, 1958     J. LOVELL     2,834,218
SCANNING DEVICE
Filed July 1, 1957     3 Sheets-Sheet 2
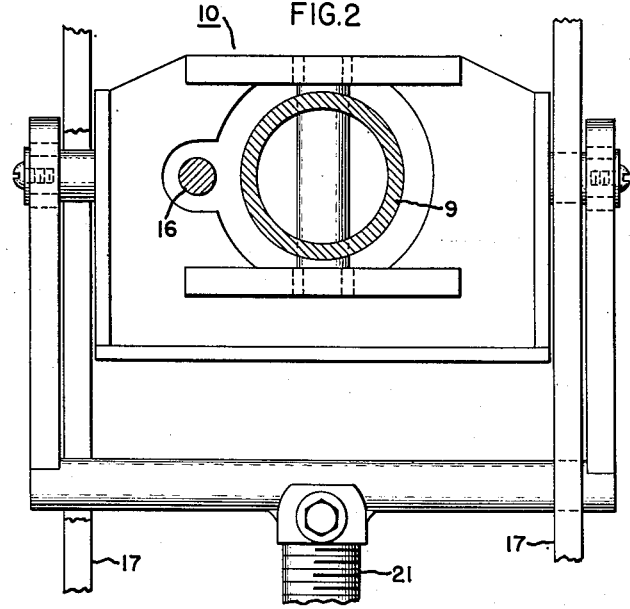
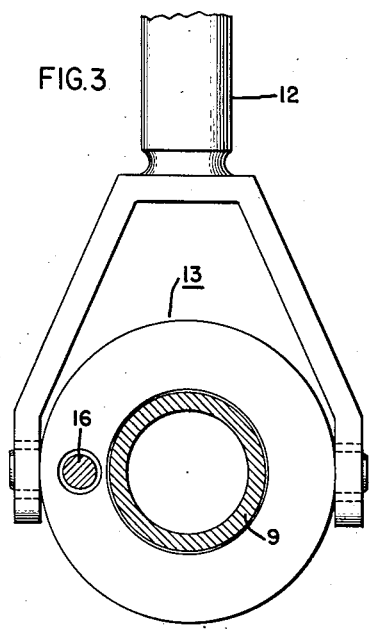
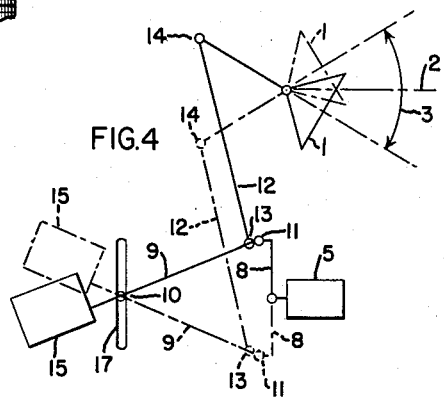
INVENTOR:
JOHN LOVELL,
BY 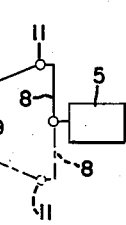
HIS ATTORNEY.

May 13, 1958  J. LOVELL  2,834,218
SCANNING DEVICE
Filed July 1, 1957  3 Sheets-Sheet 3
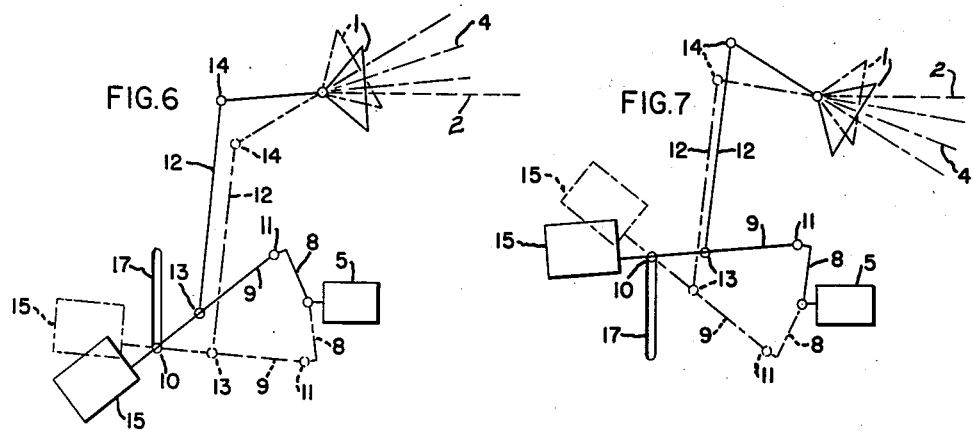
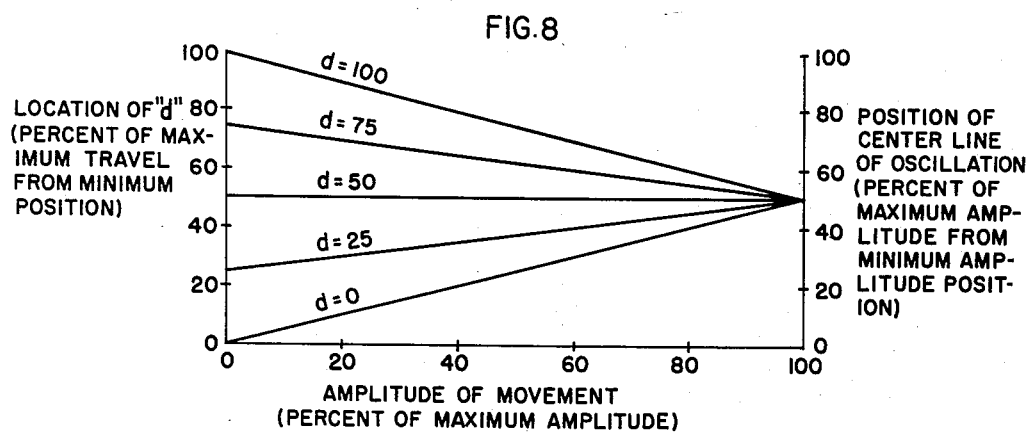
INVENTOR:
JOHN LOVELL,
BY Michael Masnik
HIS ATTORNEY.

United States Patent Office 2,834,218
Patented May 13, 1958

2,834,218

SCANNING DEVICE

John Lovell, East Syracuse, N. Y., assignor to General Electric Company, a corporation of New York Application July 1, 1957, Serial No. 669,019

7 Claims. (Cl. 74—86)

This invention relates to positioning apparatus and particularly to arrangements for providing a nodding action with control of the angle of nod. In certain mechanical applications, as for example the positioning of objects such as antennas, light sources, etc., it is desirable to provide a mechanical nodding action about a given centerline while permitting independent control of the centerline position and the angle of nodding. Previous arrangements for accomplishing these results have proven to be cumbersome, expensive to construct and limited in their range of control and adjustment, etc.

It is therefore an object of my invention to provide an improved nodding apparatus.

It is another object of my invention to provide an arrangement permitting nodding action to be accomplished about a given centerline with independent control of the centerline positioning and the nod angle.

It is another object of my invention to provide an improved signal processing arrangement.

It is a further object of my invention to provide means for making adjustments in the type of motion traced out by a moving mechanism while the mechanism is in motion.

It is a further object of my invention to provide an electro-mechanical arrangement permitting simultaneous adjustment of the centerline of nodding action and the angle of nodding.

Briefly, in accordance with one embodiment of the invention, a connecting rod is provided for establishing a nodding action. The connecting rod is connected at one end in slidable engagement with a driving arm. The driving arm is connected at one end to a pivot point and has its other end engaged by means of a crank with a shaft rotating about a given centerline. Adjustment of the position of the nodding axis is accomplished by adjusting the position of the pivot point with respect to said centerline. Adjustment of the amplitude of nodding is accomplished by adjustment of the position of the connecting rod along the length of the driving arm.

For a better understanding of my invention, reference is made to the following description taken in connection with the accompanying drawings and the appended claims wherein Fig. 1 is a side view partly in section of one embodiment of the invention, Fig. 2 illustrates certain details of pivot point shown in Fig. 1, Fig. 3 illustrates certain details of the sliding collar and other elements shown in Fig. 1, and Figs. 4 through 7 are a graphical representation useful in explaining the advantages of the present invention.

Fig. 8 illustrates graphically the desirable control effected by the present invention.

Referring now to Fig. 1, there is shown an arrangement for moving an object such as 1 above and below a predetermined centerline 2 to within predetermined amplitudes as shown by the arrows 3. It is desired to control the range of amplitudes and it is also desired to control the angular position of the centerline as shown by the arrow 4. Motor 5 imparts rotary motion to shaft 6 about a central axis 7. Crank 8 is connected at one end by means of a yoke type pivot to the shaft 6. Driving arm 9 has one end supported at a pivot point 10 and its other end mechanically engaging the crank 8 by means of a ball and socket joint 11. Details of pivot point 10 are shown in Fig. 2. Connecting rod 12 has one end slidingly engaging the driving arm 9 by means of a pivoted collar arrangement 13 as shown in Fig. 3. The other end of the connecting rod is connected to the universal joint 14 which drives the load 1.

Assuming the pivot point 10 is mounted along the centerline 7, rotation of the shaft 6 results in circular motion being imparted by means of the crank 8 to one end of the driving arm 9. The envelope of motion of the driving arm 9 describes a cone centered at the pivot point 10. The position of connecting rod 12 changes as shown in Fig. 1. This results in load 1 describing a range of reciprocating motion of range 3 about the reference line 2. To control the amplitude of the reciprorating motion, a motor 15 is provided. Motor 15 drives worm 16 in a desired direction which engages the sliding collar 13 and causes the sliding collar to move along the length of the driving arm 9. Details of the manner in which the sliding collar is driven are shown in Fig. 3. Assuming the motor 15 operated to drive the collar 13 towards the pivot point 10, that is, to a position corresponding to a smaller diameter of movement of the cone described by the driving arm 9, connecting rod 12 would operate over a smaller range of amplitude variations. This corresponds to reducing the amplitude 3 over which the load 1 is made to travel. On the other hand, if the motor 15 operates to drive the collar 13 towards the crank 8, connecting rod 12 would describe greater amplitude variations which would be imparted to the load 1.

In order to change the position of reference line 2 about which the load 1 is made to oscillate, an arrangement is provided for moving the pivot point 10. It should be noted that pivot point 10 is constrained in its movement by means of the guiding frame 17. Motor 18 drives a worm 19. Worm 19 imparts motion to the wormgear 20 connected to the jack screw 21. Jack screw 21 imparts motion to the pivot point assembly 10 and causes the pivot point 10 to move within the region permitted by the guiding frame 17 above and below the centerline 7. Assuming the motor 18 operates to drive the pivot point above the centerline 7, driving arm 9 is caused to describe a cone with its pivot point located above the centerline 7. This results in connecting rod 12 assuming a new centerline of movement 2 with respect to its previous position. In this case the centerline 2 would move upwards with respect to its former position. On the other hand, if the motor 18 operates to drive the center point 10 to a position below the centerline 7, arm 9 now describes a cone about a center point below the centerline 7. This results in the connecting rod assuming an amplitude variation about a new centerline 2 below that originally held. Thus it is seen by adjusting the center point 10 with respect to the reference line 7, the centerline 2 of load 1 movement can be adjusted. It should be noted that the adjustments of the centerline position 2 and the range of amplitude variation 3 can be independently and simultaneously controlled by the respective control motors 15 and 18.

Assuming that load 1 is to be restricted to prescribed maximum limits of travel, it should be noted that the present arrangement will operate to satisfy these limits, that is, no combination of centerline positioning and range of amplitude variation can operate to exceed the prescribed limits. The maximum amplitude of movement is controlled by the length of the crank arm 8, which in the present application has been fixed, whereas the limits of centerline positioning is restricted by the limits imposed by the guiding frame 17 on the movement of pivot point 10.

Fig. 8 illustrates graphically the desirable control effected by the present invention. In Fig. 8 amplitude of movement in percent of maximum amplitude is plotted as abscissa and location of pivot point 10 as percent of maximum travel from minimum position is plotted as ordinate. The position of the centerline of oscillation in percent of maximum amplitude from minimum amplitude position is also plotted as ordinate. Thus, for example, if the position of the pivot point 10 corresponds to 50% of maximum travel from minimum position, amplitude of movement of the load can vary from 0 to 100% of maximum amplitude.

Figs. 4 through 7 illustrate pictorially the desirable control effected by the present invention. In Fig. 4 the mechanism is shown positioned for a large amplitude 3 of nod about the centerline 2 which is accomplished by moving the sliding collar 13 toward the crank 8. In Fig. 5 the mechanism is shown positioned for a small amplitude 3 of nod about the centerline 2 which is accomplished by moving the sliding collar 13 toward the pivot point 10. Fig. 6 shows the change of the centerline position 4 above the original centerline 2. Pivot point 10 is adjusted from its nominal center position to a lower position to raise the centerline of nodding to a new, higher elevation 4. Fig. 7 shows the change of centerline position 4 below the original centerline 2 which is accomplished by moving pivot point 10 above its nominal position in the guiding frame 17. Thus for a given crank arm length various combinations of centerline position and range of amplitude displacement can be achieved by simple control of the position of the pivot point 10 and the location of the sliding collar 13.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a shaft, means for rotating said shaft about a given centerline, a crank, a driving arm having one end supported at a pivot point, means for causing said arm to trace out a cone of movement with respect to said pivot point comprising said crank having one end connected to said rotating shaft and its other end connected to the other end of said driving arm for driving said arm with respect to said pivot point, a connecting rod, means for imparting a component of linear movement of given amplitude to one end of said rod with respect to a given reference line comprising a collar for coupling said rod at the other end to a position on said driving arm, means for adjusting the position of said reference line comprising a first driven screw device operative to adjust the position of said pivot point with respect to said centerline, means for adjusting said amplitude a second driven screw device operative to adjust the coupling position of said collar along the length of said driving arm, and means for independently operating each of screw devices during movement of said rod.

2. In combination, a shaft rotating about a given centerline, a crank, a driving arm having one end supported at a pivot point, said crank having one end connected to said rotating shaft and its other end connected to the other end of said driving arm for imparting a movement to said arm with respect to said pivot point, a connecting rod, means for imparting a component of movement of given amplitude to one end of said rod with respect to a given reference line comprising means for coupling said rod at the other end to a position on said driving arm, means for adjusting the position of said reference line comprising means for adjusting the position of said pivot point with respect to said centerline, and means for adjusting said amplitude comprising means for adjusting the coupling position of said connecting rod along the length of said driving arm.

3. In combination, a shaft, means for imparting a component of rotational motion to said shaft about a given centerline, a crank, a driving arm having one end supported at a pivot point, means for causing said arm to trace out a cone of movement with respect to said pivot point comprising a yoke pivot device coupling one end of said crank to said shaft and a ball and socket device coupling the other end to the other end of said driving arm for driving said arm with respect to said pivot point, a connecting rod, means for imparting a component of linear movement of given amplitude to one end of said rod with respect to a given reference line comprising a pivoted collar for coupling said rod at the other end to a position on said driving arm, means for adjusting the position of said reference line comprising first means operative to adjust the position of said pivot point with respect to said centerline, means for adjusting said amplitude comprising second means operative to adjust the coupling position of said pivoted collar along the length of said driving arm, and means for independently operating said first and second means during movement of said rod.

4. In combination, a driving arm supportedly pivoted at a first point, means for moving said arm to trace out a cone of motion with the cone having its apex located at said first point, a connecting rod, means for imparting a component of angular motion of given amplitude to one end of said rod with respect to a given reference line comprising adjustable means for coupling said rod at the other end to a position on said driving arm, means operative to change the centerline of motion of said cone comprising first means for changing the position of said first point, means for adjusting said amplitude comprising second means operative to adjust the position of coupling of said rod to said driving arm, and means for independently operating each of said first and second means.

5. In combination, a driving arm supportedly pivoted at one point, means for moving said arm to trace out a cone of motion about said pivoted point with a given centerline, a connecting rod, means for imparting a component of motion of given amplitude to one end of said rod with respect to a given reference line comprising adjustable means for coupling said rod at the other end to a position on said driving arm, first means operative to adjust the position of said pivoted point to change the angular position of said centerline, means for adjusting said amplitude comprising second means operative to adjust the position of coupling of said rod to said driving arm, and means for independently operating said first and second means during said motion of said rod.

6. In combination, a shaft, means for imparting a component of rotational motion to said shaft about a given centerline, a driving arm having one end supported at a pivot point, means responsive to the rotational motion of said shaft for causing said arm to trace out a cone of movement with respect to said pivot point, a connecting rod, means for imparting a component of linear motion of given amplitude to one end of said rod with respect to a given reference line comprising adjustable means for coupling said rod at the other end to a position on said driving arm, means for changing the position of said reference line comprising first means operative to adjust the position of said pivot point with respect to said centerline, means for adjusting said amplitude comprising second means operative to adjust the position of coupling of said rod to said driving arm, and means for independently operating said first and second means during said motion of said rod.

7. In combination, a driving arm pivoted at a first point, means for angularly moving said arm about a given centerline passing through said first point, a connecting rod, means for angularly moving a point at one end of said rod over a given range of amplitude with respect to a given reference line comprising adjustable means for coupling said rod at the other end to a position on said driving arm, means for changing the angular position of said centerline comprising first means operative to adjust the position of said first point, means for adjusting said range of amplitude comprising second means operative to adjust the position of coupling of said rod to said driving arm, and means for independently operating said first and second means.

References Cited in the file of this patent

UNITED STATES PATENTS 2,757,543     Allan  ---------------- Aug. 7, 1956

FOREIGN PATENTS 900,921     Germany  -------------- Jan. 4, 1954